United States Patent [19]
Toedtman et al.

[11] 3,816,642
[45] June 11, 1974

[54] FLEXIBLE INSULATING SHEATH FOR DIRECT BURIED POWER LINES

[75] Inventors: John August Toedtman; James Joseph Cooper, Jr., both of St. Louis, Mo.

[73] Assignee: International Telephone and Telegraph Corporation, New York, N.Y.

[22] Filed: June 7, 1972

[21] Appl. No.: 260,406

Related U.S. Application Data

[63] Continuation of Ser. Nos. 110,308, Jan. 21, 1971, abandoned, and Ser. No. 810,729, March 26, 1969, abandoned.

[52] U.S. Cl. ............................... 174/138 F, 174/93
[51] Int. Cl. ............................................ H02g 15/08
[58] Field of Search .............................. 174/91–93, 174/88 R, 138 F; 339/203, 205, 213, 94

[56] References Cited
UNITED STATES PATENTS
2,935,720  5/1960  Lorimer ....................... 174/93 UX
3,518,358  6/1970  Brown ............................ 174/93 X

*Primary Examiner*—Darrell L. Clay
*Attorney, Agent, or Firm*—James B. Raden; Marvin M. Chaban

[57] ABSTRACT

A substantially cylindrical or tubular insulating sheath provides a waterproof protection for a splice or connection between electrical power distribution conductors. An internal rib and shoulder configuration cooperates with the spliced conductors to seal each end of the sheath. The construction is arranged to increase the sealing forces acting upon the sheath responsive to increased pressure either inside or outside the sheath.

4 Claims, 9 Drawing Figures

PATENTED JUN 11 1974

INVENTORS
J.A. TOEDTMAN
BY J.J. COOPER

ATTORNEY

FLEXIBLE INSULATING SHEATH FOR DIRECT BURIED POWER LINES

The present application is a continuation of Ser. No. 110,308 filed Jan. 21, 1971 and Ser. No. 810,729, filed Mar. 26, 1969, both now abandoned.

The invention relates generally to improvements in insulated covers for directly buried electrical conductor splices, and more particularly to flexible waterproof sheaths for protecting the spliced connection points of underground power distribution lines.

Ground water presents a problem which must be solved for the successful operation of direct buried underground electrical distribution lines. In particular, the spliced connection points of such lines must be kept dry at all times. To accomplish this task, rubber sheaths are sometimes fitted over the spliced connection points. Heretofore, these tubular sheaths have worked well, only so long as the buried splice remained in an undisturbed condition, and they were sometimes sealed against an increase in pressure on the inside of the sheath. However, if pressure builds-up alternately on the outside and the inside of the sheath, it has tended to leak at the points where the conductors enter the sheath.

Moreover, it is not always possible to predict whether the pressure will be external or internal. Thus, for example the access points at the ends of the sheath, which normally act as seals, are very likely to open when external hydrostatic pressure goes up. Or, heat from the conductor may expand the air inside the sheath. This tends to increase internal air pressure and stretch the sheath, thereby increasing the likelihood that the sheath will leak. Less dramatically, the uneven ambient pressure caused by weather conditions are likely to cause a gap between the conductor and that part of the sheath margin diametrically opposite to the pressurized zone, thus allowing the entry of moisture.

Accordingly, an object of this invention is to provide new and improved waterproof insulating covers or sheaths for electrical splice or connection points in direct buried power distribution systems. In particular, an object is to provide such a cover or sheath which remains sealed despite changes in pressure either inside or outside the cover. Another object is to provide means for maintaining the elasticity of the cover throughout a greater period of time and over a greater temperature range than was heretofore available.

Yet another object is to provide a greater heat transfer from electrical splice junctions than was heretofore available.

Still another object of the invention is to provide a simple, trouble free insulating sheath. In this connection, an object is to provide a nearly-foolproof insulating sheath which is easy to use in the field.

In keeping with an aspect of the invention, these and other objects are accomplished by a waterproof sheath comprised of a tubular or cylindrical body including open end portions which may be sealed by closure end caps where conductors enter the body. These end caps have relatively flexible end walls, each with a sealing tube extending through it. If the pressure raises on the outside of the sheath, the outer ends of the sealing tubes are squeezed; or, if the pressure raises inside the sheath, the inner ends of the sealing tubes are squeezed inside the body. Either way the higher pressure acting upon the sheath increases the sealing forces.

The above mentioned and other features and objects of this invention and the manner of obtaining them will become more apparent, and the invention itself will be best understood by reference to the following description of an embodiment of the invention taken in conjunction with the accompanying drawings, in which.

Figure 1:
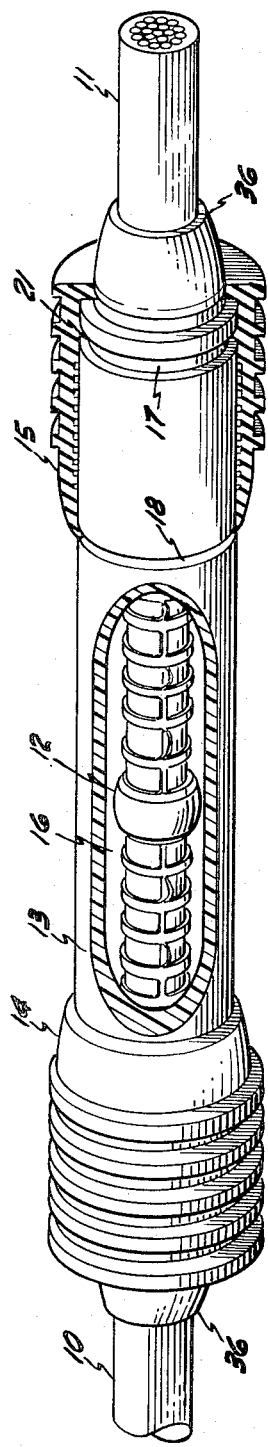
FIG. 1 is a perspective view illustrating a waterproof sheath which includes a tubular body, end caps, a pair of conductors and a splice joining the conductors.

FIG. 1 illustrates a waterproof, underground splice connector sheath which includes the inventive features. A pair of conductors 10, 11 joined by a splice connector 12 (of any suitable type) provides a continuous main power conductor. The conductors 10, 11 may or may not be the same diameter. The reason for making the connection is not important to the invention. For present purposes, this may be viewed as a single splice made in an underground residential electrical power distribution system.

The splice is covered by a sheath comprising a somewhat tubular waterproof body 13 sealed at opposite ends by flexible end caps 14, 15. The tubular body 13 is here shown, for descriptive purposes, as being cut away at 16 to disclose the splice connector 12; it should be understood, however, that this cut away section does not actually appear in the end product, waterproof covering. In one embodiment the body was a black rigid PVDC material. Adjacent each end of the tubular body 13, there is a mechanical lock formed by locking groove 17, a mating ridge 21 which will lock into the groove. Preferably, the groove 17 is a little wider than the ridge 21 to allow for manufacturing tolerances. When the end cap is slipped onto the body as far as an indicator mark 18, the ridge and groove will snap together. The end caps 14, 15 are preferably formed of rubber or other electrically nonconducting elastic material, such as the "Nordel" EPDM sold by the Du Pont Company.

Figure 2:
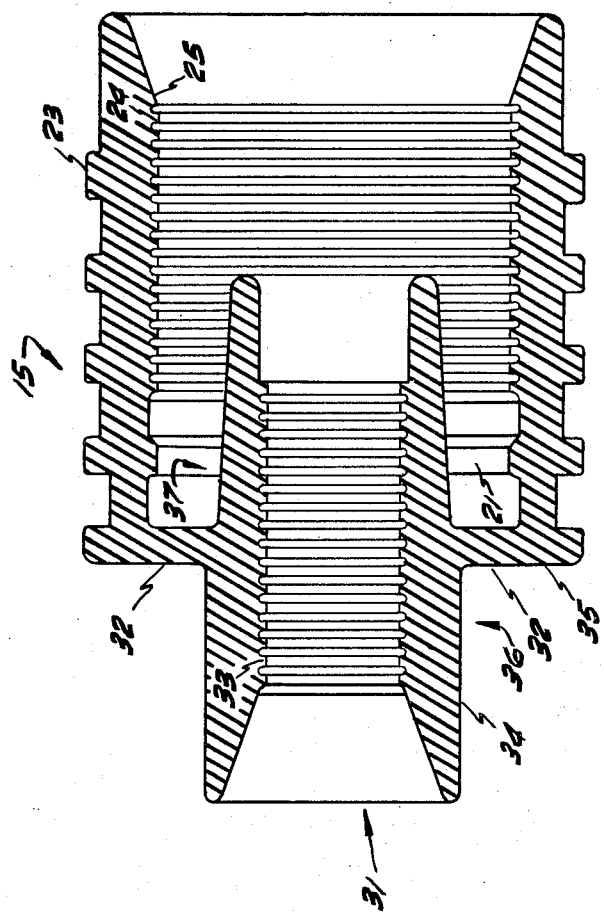
FIG. 2 is an enlarged cross-sectional view of a flexible end cap for sealing the end of the tubular body to the conductor and complete the housing sheath.
Figure 3:
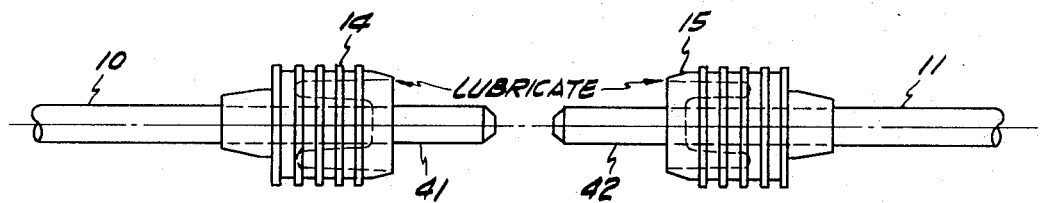
FIGS. 3–6 are a series of side views of the inventive sheath showing the successive steps to be followed in the field when the insulation sheath is applied over a splice.
Figure 4:
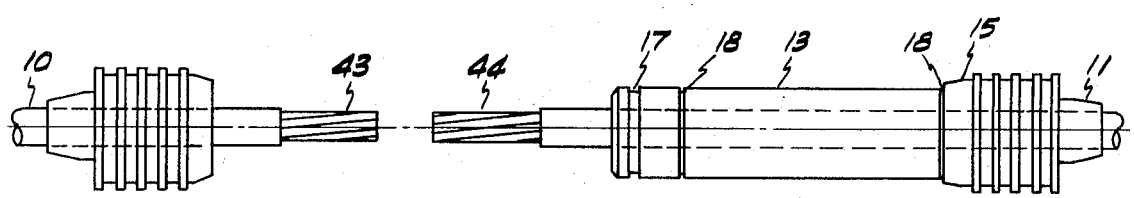
Figure 5:
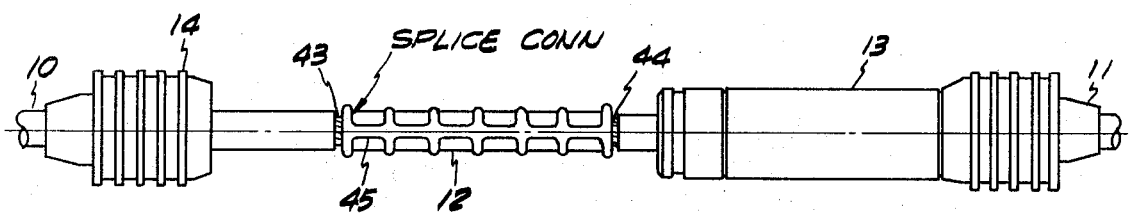
Figure 6:
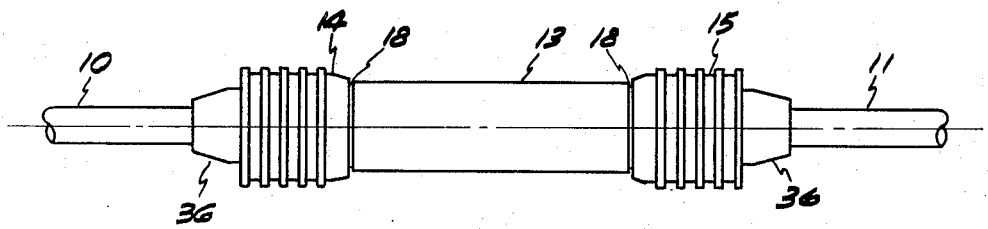

Each end cap is made somewhat in the form of a cylinder which has a large diameter open end for fitting over the body and is closed at the other end, with the closed end pierced by a sealing tube, as shown in FIG. 2. On its outer surface, the end cap 15 is provided with projecting reinforcing ribs 23 which facilitate the stretching of the cap 15 to enable it to tightly, yet slidably, fit over the end of the tubular body 13. These ribs help cool, retain elasticity at higher temperature, and provide mechanical seats for clamps or hangers when required. The circumferential ribs 24 on the inside of the end cap assist in the retention of the cap 15 on the body 13. The outer end 25 is tapered upwardly (as viewed in FIG. 2) to facilitate the fitting of the end cap 15 over the end of the body 13. The inwardly facing ribs 24 also help seal the body 13 against the ingress of moisture. To do this, the internal diameter of the annular ribs 24 is made slightly smaller than the outside diameter of the body 13 so that there is a pressure contact between the inside marginal face of the ribs 24 and the body 13. It should now be clear that the end cap 15 is circumferentially stretched when it is in its final location on the body 13. The resulting pressure contact between the cap 15 and the body 13 provides a peripheral seal. Moreover, any tendency for the body material to cold flow will result in custom-made, mating circular ribs forming on the tubular body, thus better completing the seal.

In operation, the sheath is likely to encounter longitudinal stresses in an axial direction, and these stresses will tend to separate the end caps 14, 15 from the conductors 10, 11. Such longitudinal stress may be caused by the expansion of the air within the interior of the tubular body 13 responsive to the heat given off by the conductors 10, 11. Or the longitudinal stresses may be caused by hydrostatic or other pressures, in which case the outside of the body has a higher pressure.

In keeping with an aspect of the invention, the outer end of the cap 15 includes an entrance port or portion 31 comprising a sealing tube of reduced diameter. The outer end of this sealing tube is flared to receive a conductor 10 or 11. The end cap thus constitutes a closure means in which the sealing tube 31 is joined by a flexible transverse end wall 32 of cap 15 to the cylindrical part of the cap which fits over the tubular body 13. The interior of the sealing tube 31 includes a cylindrical wall having a plurality of internal, annular ribs 33. The minimum diameter across the inside ribs is smaller than the outside diameter of the conductor 10 or 11. Thus, these ribs form a snug seal between the cap and the conductor. In addition, the relative thickness of the wall 34 provides a great mechanical strength for sealing the end of the cap on the conductor 10, 11. It should now be clear that the transverse end wall 32, which joins the sealing tube 31 with the outer wall of the end cap provides a relatively flexible portion of the insulating sheath. Since this flexible end wall is adjacent relatively stiff closure wall means 34, 35, it provides a bending zone for accommodating a change in attitude, or direction of the conductor while maintaining the seal.

A very important aspect of the invention resides in the fact that the sealing tube 31 is relatively long, and it extends completely through and projects outwardly from each side of the end wall 32. Thus, if the hydrostatic (or other pressure) builds up outside the insulating sheath, the outer end section 36 of the sealing tube is squeezed to make a tighter seal on the cable. Or, if the gas pressures build up inside the sheath, the inner end 37 is squeezed to make a tighter seal. Thus, it makes no difference whether pressure increases or decreases inside, outside, or both inside and outside the sheath. The integrity of the seal is maintained.

The manner and mode of operation and use of the invention should become more apparent from a study of FIGS. 3–6 which illustrate the steps followed when the sheath is assembled in the field. The first field assembly step (FIG. 3) is to lubricate the ends 41, 42 of the cables or conductors 10, 11 and inside the large end of the cap; then, the end caps 14, 15 are slipped on over the ends of the conductors. Lubrication material of this type is well known.

The second field assembly step (FIG. 4) is to strip the insulation from the ends of the conductors 10, 11, as shown at 43, 44. The insulating body 13 is fitted over an end 44 of the conductor 11 and pushed into the cap 15 as far as the indicator line 18. At this point the ridge 21 inside cap 15 snaps into the groove or notch 17 to complete a mechanical lock between the body and end cap.

The third field assembly step (FIG. 5) is to place an electrical splice connector 12 over the stripped ends 43, 44 of the conductors 10, 11, and then the connector is crimped in place, as at 45, for example.

The fourth field assembly step (FIG. 6) is to slide the body 13 with cap 15 attached to the left until the body 13 snaps into the cap 14. When the surface of the large edge of cap 14 reaches the mark 18, the ridge 21, inside cap 14 is resting in the groove or notch 17. This completes the assembly of the waterproof sheath with the electrical connection inside it.

The foregoing explains how to construct the inventive sheath having means for inherently and automatically increasing the sealing pressures, at the junctions between the cable jackets and end caps, responsive to an increase of pressure either inside or outside the sheath.

Figure 7:
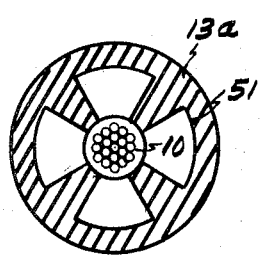
FIGS. 7–9 are cross-sectional end views of the sheath showing how pressure inside the sheath may be controlled.
Figure 8:
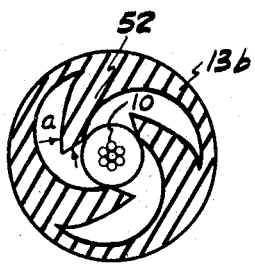
Figure 9:
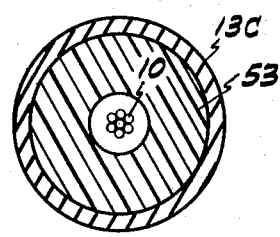

In addition, means may be provided for reducing the probability that pressure will unduly increase inside the sheath. In greater detail, to reduce the probability of excessive pressure changes inside the sheath, it is desirable to increase the heat transfer from the conductor to the outside of the sheath. FIGS. 7–9 explain how this may be accomplished. The principle behind of each of these figures is to reduce the dead air space inside the sheath and to increase the contact between the conductor and the outside surface of the sheath.

In a first embodiment, FIG. 7, simple fins 51 are formed inside the tubular body 13a to conduct heat away from conductor 10 and to the outside.

In FIG. 8, the fins 52 are made much longer so that they must fold over and occupy more of the dead air space. To help these fins 52 nest in a proper manner, the ends which engage the conductor are formed with a slant face as indicated by the angle $a$. Then, as the lubricated conductor 10 is pushed into the tubular body 13b, all of the fins (such as 52) are deflected and pushed away from the conductor in the same direction (here counterclockwise) so that they roll over or fold in and nest together. By a proper design, the fins 52 may be made to occupy almost all of the dead air space inside the body 13b without increasing the restraint against sliding the conductor into place.

In yet another embodiment (FIG. 9), the inside of the body may be filled with a fluid or fluid-like material 53 for conducting heat away from the electrical conductor 10. While various fluids may be used, I prefer to use either castor oil or silicone grease. If desired, the fluid may be loaded with zinc or aluminum particles. Some have suggested the use of sodium metal as a heat conductor. However, sodium has an affinity for moisture. Therefore, if it is used, it would be well to overfill the sheath to give it a positive pressure. Then, if a gap forms at the seal point, the sodium metal would push the moisture out rather than let it in. Yet another filling material 53 may be a flexible solid, such as wire mesh and especially a random weave mesh.

While the principles of the invention have been described above in connection with specific apparatus and applications, it is to be understood that this description is made only by way of example and not as a limitation on the scope of the invention.

We claim:

1. A waterproof sheath for surrounding and protecting a splice on a power distribution cable or conductor system comprising a somewhat tubular body which is open at each end, a pair of elastic cylindrical end caps, each of said caps having a large diameter open end with dimensions which snugly fit over the tubular body and an opposite end closed by a flexible wall, means for giving said conductor entrance and exit to said sheath, and means comprising a sealing tube of reduced diameter piercing the flexible wall and projecting outwardly on either side of the wall, said sealing tube having an inside diameter which is less than the outside diameter of said power conductor whereby said sealing tube forms a snug fit when the tube is slipped over said power conductor, and pressure control means inside said tubular body for reducing the probability that there will be an excessive pressure change inside said sheath, said pressure control means comprising a plurality of fins integrally formed inside said tubular body and extending inwardly to come into contact with said conductor.

2. The sheath of claim 1, further including folding control means for causing said ribs to fold in and nest together responsive to insertion of said conductor into said sheath.

3. The sheath of claim 2, wherein said folding control means comprises a slant face on said ribs for deflecting said ribs in a given direction when said sheath is slipped on over said conductor.

4. The sheath of claim 1, further comprising alternate peripheral grooves and ribs on said member adjacent the ends thereof, and like ribs and grooves in the inner surface of said tubular outer wall adjacent said entrant portion for matingly receiving said member grooves and ribs.

* * * * *